United States Patent [19]

Khoi

[11] Patent Number: 4,554,830

[45] Date of Patent: Nov. 26, 1985

[54] LEVEL DETECTION HEAD FOR HYDROSTATIC EFFECT WITH PROTECTION

[75] Inventor: Danny J. Khoi, Saint Cloud, France

[73] Assignee: Materiel et Auxiliaire de Signalisation et de Controle pour l'Automation-Auxitrol, Courbevote, France

[21] Appl. No.: 481,351

[22] Filed: Mar. 2, 1983

[30] Foreign Application Priority Data

Mar. 3, 1982 [FR] France ............... 82 03505

[51] Int. Cl.[4] ............................................ G01F 23/14
[52] U.S. Cl. ...................................... 73/299; 73/721; 73/706; 137/557; 137/558
[58] Field of Search ............... 73/299, 302, 706, 716, 73/721, DIG. 4; 92/48; 137/557, 558

[56] References Cited

U.S. PATENT DOCUMENTS

| | | | |
|---|---|---|---|
| 2,981,110 | 4/1961 | Fenn et al. | 73/716 |
| 4,295,117 | 10/1981 | Lake et al. | 338/4 |
| 4,301,685 | 11/1981 | Guillemot | 73/723 |
| 4,326,423 | 4/1982 | Hartemann | 73/861.63 |
| 4,409,833 | 10/1983 | Thomson et al. | 73/302 |

FOREIGN PATENT DOCUMENTS 2128815 3/1972 France ............... 73/302

OTHER PUBLICATIONS

Fluidic/Pneumatic Level Measurement of Cryogenic Fluids, Edward Samuels (President) Sepctrum Products, Inc., 1976.

Primary Examiner—Steven L. Stephan
Assistant Examiner—W. Morris Worth
Attorney, Agent, or Firm—Fleit, Jacobson, Cohn & Price

[57] ABSTRACT

The head for the hydrostatic detection of a liquid level includes a main enclosure which is divided by a membrane into two chambers, one of which communicates with a supply of air under pressure, while the other is joined to a probe that is immersed deeply into the liquid. That connection is made, in this case, by the intermediary of an auxiliary enclosure that also contains a primary chamber that communicates with the inlet of the air under pressure, and a secondary chamber which is separated from the primary chamber by a membrane. That membrane forms one piece with a valve mounted between the chamber and a small connecting conduit connected with a probe, which prevents any ill-timed rise of the liquid inside the device, in the case of the disappearance of the compressed-air supply, and which makes it possible, at the same time, to install the detector head above the tank.

5 Claims, 3 Drawing Figures

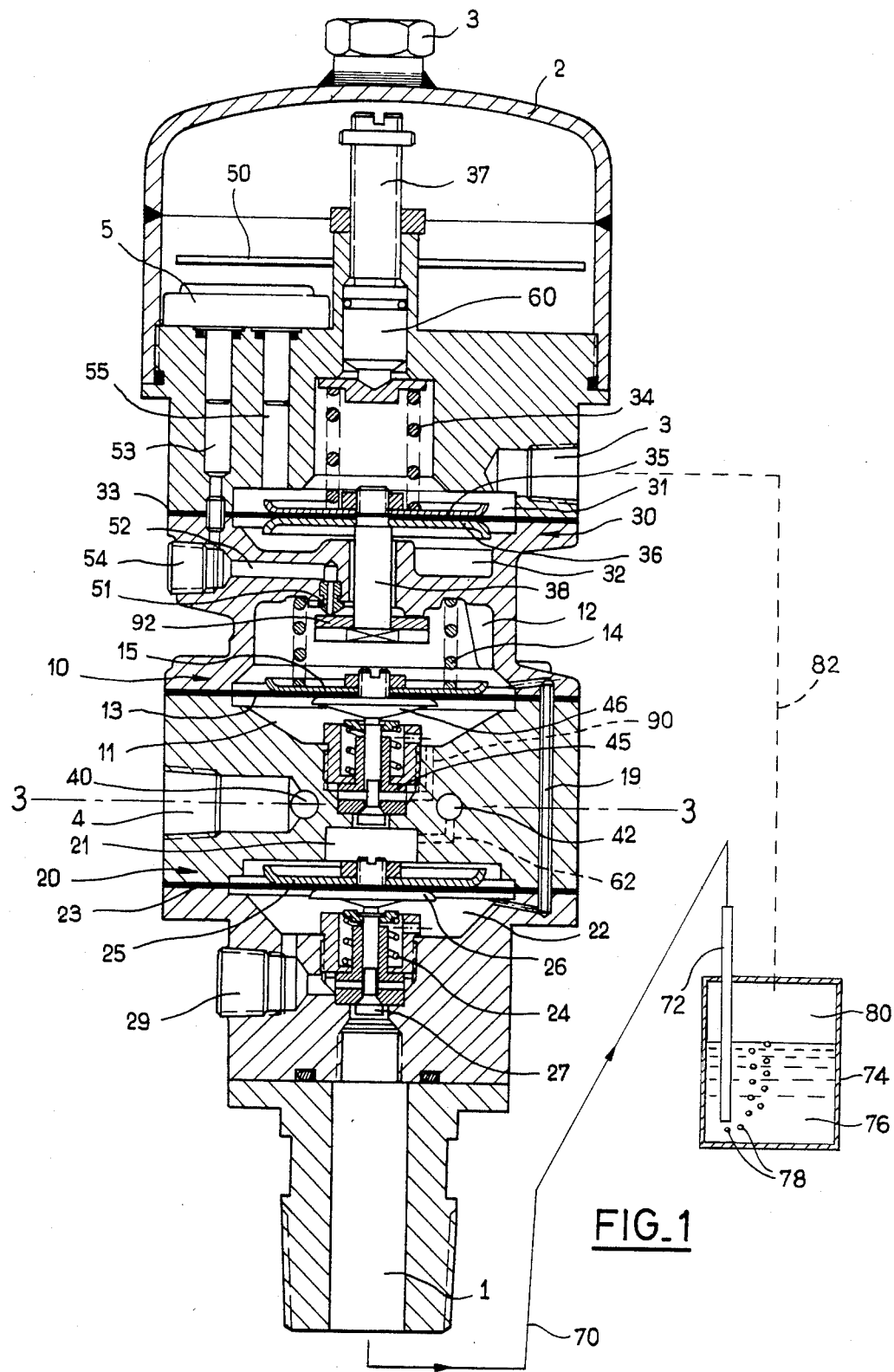
FIG_1

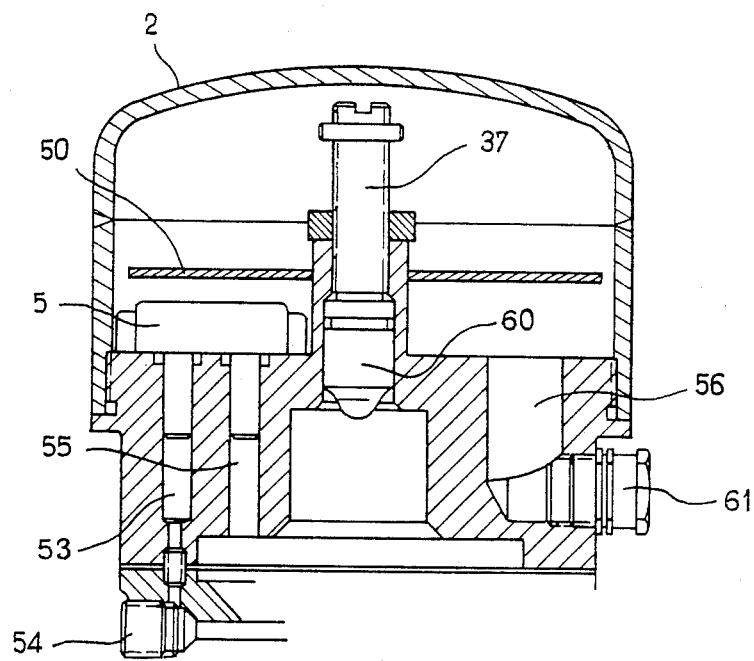
FIG_2
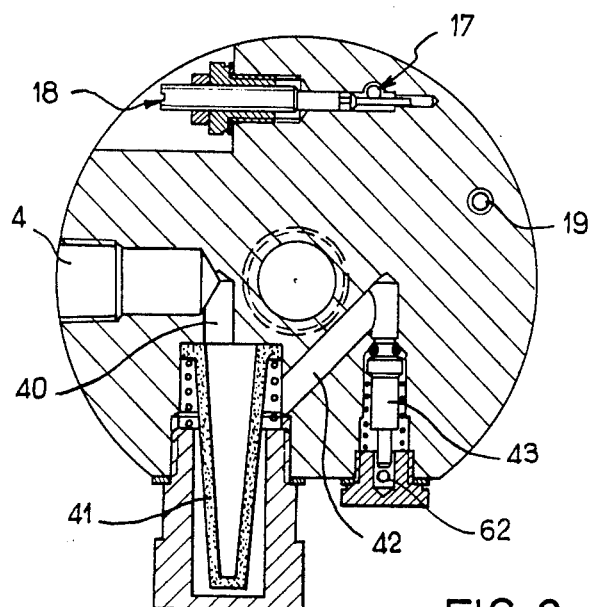
FIG_3

LEVEL DETECTION HEAD FOR HYDROSTATIC EFFECT WITH PROTECTION

The invention is concerned with measuring the liquid level in tanks by means of the insufflation of gas. This type of measuring introduces a head for finding the level by hydrostatic action, said head being connected with the tank and designed to be joined to a probe that dips into the liquid, of which the level is to be measured, practically all the way to the bottom of the tank.

Detector heads of this type are already known; they comprise a main enclosure that is subdivided into an upper chamber and a lower chamber by means of an elastically adjustable membrane. In the lower part of the detector head, a probe opening has been provided that communicates with the lower chamber. In addition, a feed pipe for gas under pressure communicates with the upper chamber through an intermediate valve that is connected with the membrane, in such a way that it defines the pressure above the membrane in relation to the pressure below the membrane at the top of the probe. Lastly, a diversion for the adjustment of the flow has been provided, which is arranged between the upper and lower chambers, and a pressure-sensitive organ is connected with the lower chamber; that makes it possible to measure the pressure below the organ that corresponds to a given flow, and thereby the level of the liquid.

These devices are used, in particular, on board ships and, up to this time, have been equipped with analog indicating dials. Under these conditions, a central station is provided on the vessel where all the heads for finding the level are arranged and connected by means of appropriate pipe systems with their pertinent tanks, it being observed that the length of those pipe systems that are filled with gas, modifies the measurement but very slightly. A first disadvantage has been found. Leaks may occur over the lengths of the pipe connections provided between the detector head at the central station and the tank, and a further disadvantage is that those pipe systems are very often placed at inaccessible sites and may extend over several hundred meters. A leak of this kind renders the obtained indication of the level meaningless, as a matter of course.

In addition, it appeared to be desirable to make the measurements more exact. That presupposes, first of all, that the information regarding the pressure is taken at the level of the tank rather than at a distance, so as to eliminate any errors that may be due to the lengths of the afore-mentioned pipe systems; it presupposes also the use of more exact means for the determination of the pressure, as well as the conversion of their indications into numeric electric signals.

In correlation with those needs, another problem has come to the fore: up to this time, one has left to the operator, at the level of the central station, the responsibility of taking action in order to prevent the harmful effects of a fall of the pressure of the compressed air on the detector head, as well as the responsibility of handling the clearing of the device when the level has risen in the interior of the probe, precisely because the compressed air supply has gone down.

The present invention essentially aims at an appreciable improvement of this situation.

To that end, and in accordance with a first characteristic of the invention, the connection between the lower chamber and the probe comprises an auxiliary enclosure which is also divided—like the main chamber—into an upper auxiliary chamber and a lower auxiliary chamber, by means of another membrane. The upper auxiliary chamber communicates with the feed-pipe of gas under pressure, while the lower auxiliary chamber serves as a connection between the upper main chamber and the probe, while it comprises a calibrated elastic means of adjustment, as well as probe valve. The probe valve has been mounted, in such a way that it closes when no gas under pressure arrives, and that prevents a rise of the liquid from the tank toward the head for determining the level. In addition, at the level of the valve of the probe, an orifice has been provided that is normally closed and makes it possible to verify the determination of the level in situ.

In accordance with another interesting characteristic of the invention, the connection between the lower chamber and the pressure-sensitive organ comprises a safety valve. A reference enclosure is provided which is divided by a third membrane into a reference pressure chamber and a protective chamber which is connected with the lower main chamber. The reference chamber comprises another calibrated elastic means of adjustment, and the third membrane is connected with the safety valve so as to close the latter in case of excess pressure in the lower main chamber. In that way, the pressure-sensitive member is prevented from being damaged by excess pressure. It should be noted that important accidental excess pressures of this type may occur in the case of vessels carrying gases made liquid by means of cold and pressure.

In a special kind of embodiment of the invention, the pressure-sensitive member comprises a piezoresistant quartz. It is advantageously connected with a circuit that comprises, by preference, a decade resistance network for the range adjustment and/or for the adjustment as a function of the density of the liquid.

In a particularly advantageous kind of embodiment of the invention, the reference chamber comprises a connecting orifice toward the top of the tank, or "gaseous sky", and another connection with the pressure-sensitive member, in which case the latter will then detect the pressure difference between the height of the tank, i.e. its gaseous top, and the lower main chamber, and that is of particular interest in the case of liquified combustible gases under pressure and at a low temperature, inasmuch as the pressure of the gaseous top will then depend, to a large extent, on the existing temperature.

BRIEF DESCRIPTION OF THE DRAWING

Other characteristics and advantages of the invention will become clear during the perusal of the detailed description below, and from the attached drawings in which FIG. 1 illustrates, in the form of a vertical section view, one preferred way of embodying the detector heads in accordance with the invention;

FIG. 2 is a partial sectional view from the top of the detector head which shows certain details that do not appear in FIG. 1; and FIG. 3 is a sectional view at the level of the axis of the orifice 4 of FIG. 1.

It will be noted that certain section lines as used in the drawings are broken section lines, so as to show the details of the invention more clearly.

DETAILED DESCRIPTION OF THE DRAWINGS

Externally, the detector head of FIG. 1 comprises a hood 2 in its upper part and, in its lower part, a conduit 1 that is housed inside a threaded tube which is apt to become engaged by a probe that descends into the liquid contained in a tank. Between the two, the body of the detector head comprises a large number of members which will be described below.

Conduit 1 is connected by pipes, shown by arrows 70 in FIG. 1, to a probe 72 located in a tank 74. The probe extends to the bottom of the tank through liquid 76. Gas bubbles 78 are released from the bottom of the probe and collect at the top of the tank 80. An outlet from the top of the tank is connected to opening 3 as shown by lines 82.

Reference number 10 designates a main enclosure that is subdivided into an upper chamber 12 and a lower chamber 11, by means of a membrane 13. The upper part of the membrane 13 has been provided with a cup 15 which forms one piece with the membrane, and which supports a spring 14, the other end of which is supported by the body of the detector head. In that way, an elastic means of adjustment is defined on the membrane 13.

Now, reference will be made to FIGS. 1 and 3 at one and the same time. In these Figures, we see an inlet 4 for an under-pressure, said inlet communicating through the intermediary of a small tube 40 with a filtering body 41 of porous bronze, designed to eliminate all dust and any other substances that could be suspended in the air and would be noxious to the good functioning of the mechanism of the detector head. After the porous bronze filtering body 41, a conduit 42 brings the air under pressure to a pressure-reducing valve 43 which is mounted in series, while the outlet of said valve 43 communicates by means of a small tube 62 with upper chamber 21 of auxiliary chamber 20. Lastly, through the intermediary of a valve 45 the movable member of which forms one piece with the membrane 13, with the interposition of a cup 46 and air line 90, shown in phantom, the air under pressure arrives, in the end, at the lower chamber 11. The valve 45, integral with membrane 13, is shown in the closed position in FIG. 1. The force of spring 14, also integral with membrane 13, normally keeps valve 45 open unless the pressure in lower chamber 11 is sufficiently greater than the pressure in upper chamber 12 to force spring 14 upwardly against its bias.

In FIG. 1, we see also an auxiliary enclosure 20, in a general way, and which comprises, like the first enclosure, an upper chamber 21, a lower chamber 22, a membrane 23 the upper part of which forms one piece with a cup 25, while the lower part forms one piece with the cup 26. In its turn, that cup 26 forms one part with the spring 24, with a valve 27 that makes possible or prevents any communications between the lower chamber 22 and the conduit 1 that runs toward the probe.

It is immediately evident that, in the absence of the arrival of air under pressure at the upper chamber 21, the valve 27 will close on its seat, due to the action of the sping 24 which does not undergo an antagonistic force. Under those conditions, a rising of the liquid in the tank toward the head for the detection of the level has been prevented. Conversely, when the air under pressure is present in the upper chamber 21, that pressure is normally sufficient to ensure the opening of the valve 27 and the normal communication between the opening of the conduit 1 and the lower chamber 22 of the auxiliary enclosure. In its turn, that lower chamber 22 of the auxiliary enclosure 1 communicates, through the small pipe 19, with the upper chamber 12 of the main enclosure as mentioned above.

At the bottom of FIG. 1, we see, and also at the level of the valve 27 of the probe, an opening 29 that is closed normally and makes possible the determination of the detection of the level in situ. As a matter of fact, that opening 29 makes the direction application to the chamber 22 of any desired pressure possible, without passing through the valve 27. That pressure is found, as a matter of course, in the upper chamber 12 of the main enclosure.

In addition, there exists a diversion 17 output flow regulating device 18, said diversion 17 being mounted between the top chamber 12 and the bottom chamber 11 of the main enclosure making it possible precisely to adjust the flow of compressed air, in such a way that that rate of flow remains very low at the level of the end of the probe. With a control device of that kind, one is sure that there is practically no dynamic pressure drop where the air flows out. Since the height of the air column presents, moreover, a very slight pressure effect in relation to the height of the liquid column, we find, practically at the level of the chamber 12, a pressure that is representative of the one that exists at the end of the conduit of the probe.

That pressure will, therefore, be quite indicative of the level of the liquid.

Now, when we take the upper chamber 12 into consideration, we see that, between it and the pressure-sensitive member 5, a safety valve defined by a seat 51 and a movable member 92 has been provided. The seat 51 communicates, through a central opening, with a small horizontal pipe 52 that ends in an opening 54 which is normally closed, as well as through a small vertical pipe 53, with one of the openings into the sensitive member 5.

On the other hand, the movable member 92 of the valve forms one piece with a pin 38 which slides with much play in a bore hole that communicates with the chamber 32 that constitutes a protective chamber. As a matter of fact, inside a third enclosure 30, that chamber 32 is situated on one side of a membrane 33, while, on the other side, a chamber 31 is present that communicates with an opening 3 that leads toward the outside and is designed to be connected either with a reference pressure or, by preference, with the pressure that is present in the "gaseous top" of the tank. It is seen, therefore, that the chamber 32 is connected with the upper chamber 12 by means of the passage way that is left around the pin 38. On the other side, parts of the membrane 33 are provided with cups 35 and 36 that form one piece with the membrane, and the cup 35 is acted upon by a spring 34 that forms an elastic calibrated adjusting device, through the intermediary of a control pin 60 that may be put into action by the effect of the thread 37 which is equipped with a screw head and accessible either by removing the hood 2 or by removing the screw 3 which rises above it.

If the inlet of air under pressure is normal, but an excessive pressure appears, nevertheless, in the lower chamber 11, that excess pressure will be sufficient to overcome the force of the adjustment as defined by the spring 34, and in consequence thereof, the valve consisting of the members 92 and 51 will close, thereby protecting the sensitive member 5.

In the case—which is preferred—when the pressure to be measured is on one side of the membrane 33, and the pressure of the "gaseous top" is on the other side, the dependability achieved is especially effective.

Under the same conditions, it is advantageous that the chamber 31 which is connected with the gaseous top, be connected, by means of a small pipe 55, with the pressure-sensitive member 5, which in this case is advantageously a member that detects the differential pressure.

In a preferred kind of embodiment of the invention, the pressure-sensitive member 5 comprises, at least, one piezo-resistant quartz, and possibly two piezo-resistant quartz, for the measurement of the differential pressure. This type of sensitive member is normally associated with an adapter circuit that may be carried by a printed circuit plate 50 which maybe situated beyond the hood 2. It is advantageous to provide, on said imprinted circuit, a decade resistance network for control of various parameters of the liquid including a system of adjustment according to the density of the liquid. Printed circuit plate 50 may have built-in electronics, so that a normalized digitalized signal may be supplied, other than the raw signal from the sensor 5.

The electrical connection for the output of the measurement is digitallaly available after appropriate conversion, run via hole 56 and connector 61 towards the central processing station where the operator stays.

It is now evident that the device in accordance with the present invention is capable to solve, in a simple manner, the aforementioned problems, while making it possible, at the same time, to install the detector head at the level of the tank itself. Safety is ensured, particularly in the case of a drop of the compressed-air feed pressure. Likewise, when it is a question of performing an unplugging of the device, it takes place in a very simple and automatic way. As a matter of fact, when the compressed air pressure disappears, the valve 27 closes immediately, thus preventing any liquid from entering into the detector head. It will then be sufficient to re-establish the feed pressure, and the air fed again through valve 27 will, as a matter of course, push back the liquid toward the end of the probe, without the liquid having been able to damage any essential parts of the devices. It will be remembered that, in general, we have to do with a rather corrosive liquid.

As a matter of course, the present invention is not limited to the type of embodiment as described above, but extends to any variation that corresponds to its spirit.

I claim:

1. A head for detecting a level of a liquid in a tank by hydrostatic action, said head being connected with a probe that is immersed into the liquid, the level of which is to be measured, said head comprising:

a main enclosure subdivided into an upper chamber and a lower chamber, an elastically adjustable membrane separating said upper chamber from said lower chamber, probe means communicating with the upper chamber, an inlet pipe for gas under pressure communicating with the lower chamber, a valve connected to the membrane to control the pressure above the membrane in relation to the pressure below the membrane, means for diverting the flow of gas to the upper chamber from the lower chamber, a member sensitive to gas pressure for measuring the gas pressure that corresponds to a given flow of gas introduced through said inlet pipe compared to gas pressure from the tank to determine the height of the liquid in the tank, and a connection of the lower chamber with the probe means comprises an auxiliary chamber subdivided in an upper auxiliary chamber and a lower auxiliary chamber, another membrane separating said upper auxiliary chamber from said lower auxiliary chamber, the upper auxiliary chamber communicating with the lower chamber and the inlet of the gas under pressure when said valve is open, and the lower auxiliary chamber communicating with the upper chamber and the probe means when said probe means is open to gas flow, a calibrated elastic means of adjustment, and a probe valve being mounted to close said probe means without receipt of gas under pressure in said upper auxiliary chamber, which will prevent a rising of the liquid of the tank through the probe means.

2. A head for the detection of a level of liquid in a tank in accordance with claim 1, further comprising an opening defined by the probe valve being closed to allow the reading of the level of the liquid in the tank in situ.

3. A head for the detection of a level of liquid in a tank in accordance with claim 1, further comprising a connection between the upper chamber and the pressure-sensitive member comprises a safety valve a reference enclosure, a third membrane subdividing said reference enclosure into a pressure reference chamber and a protective chamber that is connected with the upper chamber, and the reference chamber comprises another calibrated elastic means of adjustment, and the third membrane is joined to the safety valve, to close it in the case of excessive pressure in the lower chamber.

4. A head for the detection of a level of liquid in a tank in accordance with claim 1, wherein the pressure-sensitive member comprises a piezo-resistant quartz.

5. A head for the detection of a level of liquid in a tank in accordance with claim 3, wherein the reference chamber comprises a connecting opening connected with a top of the tank, and a connection pipe connected with the pressure-sensitive member, the pressure-sensitive member determining pressure difference between the top of the tank and the lower chamber.

* * * * *